United States Patent
Nakazato et al.

(10) Patent No.: US 9,841,271 B2
(45) Date of Patent: Dec. 12, 2017

(54) THREE-DIMENSIONAL MEASUREMENT APPARATUS, PROCESSING METHOD, AND NON-TRANSITORY COMPUTER-READABLE STORAGE MEDIUM

(75) Inventors: Yusuke Nakazato, Tokyo (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 631 days.

(21) Appl. No.: 13/515,106

(22) PCT Filed: Feb. 18, 2011

(86) PCT No.: PCT/JP2011/054206
§ 371 (c)(1),
(2), (4) Date: Jun. 11, 2012

(87) PCT Pub. No.: WO2011/105522
PCT Pub. Date: Sep. 1, 2011

(65) Prior Publication Data
US 2012/0268567 A1    Oct. 25, 2012

(30) Foreign Application Priority Data
Feb. 24, 2010    (JP) .................................. 2010-039201

(51) Int. Cl.
| G01B 11/26 | (2006.01) |
| G01B 11/03 | (2006.01) |
| G06T 7/73 | (2017.01) |

(52) U.S. Cl.
CPC .............. *G01B 11/03* (2013.01); *G01B 11/26* (2013.01); *G06T 7/75* (2017.01); *G06T 2207/10028* (2013.01)

(58) Field of Classification Search
CPC ........... G05B 2219/35315; G05B 2219/40543; G06K 9/00214; G06T 2207/10028; G06T 2207/30164

See application file for complete search history.

(56) References Cited

U.S. PATENT DOCUMENTS 4,402,053 A * 8/1983 Kelley et al. ................. 700/259
5,471,541 A * 11/1995 Burtnyk et al. .............. 382/153
(Continued)

FOREIGN PATENT DOCUMENTS

CN    101116101 A    1/2008
CN    101294793 A    10/2008
(Continued)

OTHER PUBLICATIONS

Efficient Variants of the ICP Algorithm, by Rusinkiewicz. Third International Conference on 3-D Digital Imaging and Modeling (2001).*
(Continued)

*Primary Examiner* — Jay Patel
*Assistant Examiner* — Shadan E Haghani
(74) *Attorney, Agent, or Firm* — Fitzpatrick, Cella, Harper & Scinto

(57) ABSTRACT

A three-dimensional measurement apparatus selects points corresponding to geometric features of a three-dimensional shape model of a target object, projects a plurality of selected points corresponding to the geometric features onto a range image based on approximate values indicating the position and orientation of the target object and imaging parameters at the time of imaging of the range image, searches regions of predetermined ranges respectively from the plurality of projected points for geometric features on the range image which correspond to the geometric features of the three-dimensional shape model, and associates these geometric features with each other. The apparatus then calculates the position and orientation of the target object using differences of distances on a three-dimensional space between the geometric features of the three-dimensional shape model and those on the range image, which are associated with each other.

12 Claims, 5 Drawing Sheets

(56) References Cited

U.S. PATENT DOCUMENTS

| | | | |
|---|---|---|---|
| 5,531,520 A * | 7/1996 | Grimson | G01B 11/25 |
| | | | 382/131 |
| 5,845,288 A * | 12/1998 | Syeda-Mahmood | G06F 17/30253 |
| 6,362,822 B1 * | 3/2002 | Randel | G06T 15/506 |
| | | | 345/426 |
| 7,844,105 B2 | 11/2010 | Pfister et al. | |
| 7,844,106 B2 * | 11/2010 | Pfister et al. | 382/154 |
| 8,073,201 B2 | 12/2011 | Satoh et al. | |
| 8,326,021 B2 | 12/2012 | Kobayashi et al. | |
| 8,639,025 B2 | 1/2014 | Kobayashi et al. | |
| 2006/0018539 A1 * | 1/2006 | Sato et al. | 382/173 |
| 2006/0262970 A1 * | 11/2006 | Boese | G03B 42/023 |
| | | | 382/131 |
| 2008/0152191 A1 | 6/2008 | Fujimura et al. | |
| 2008/0310757 A1 * | 12/2008 | Wolberg | G06K 9/00208 |
| | | | 382/285 |
| 2009/0033655 A1 * | 2/2009 | Boca et al. | 345/419 |
| 2010/0004861 A1 * | 1/2010 | Park | G06N 3/008 |
| | | | 701/301 |

FOREIGN PATENT DOCUMENTS

| | | |
|---|---|---|
| JP | 2006-202152 A | 8/2006 |
| JP | 2007-322351 A | 12/2007 |
| JP | 2008-269572 A | 11/2008 |
| JP | 2009-128075 A | 6/2009 |
| WO | 2010/019925 A1 | 2/2010 |
| WO | 2011/115143 A1 | 9/2011 |

OTHER PUBLICATIONS

Multiview Registration for Large Datasets, by Pulli. Proceedings 3dIM (1999).*

Multiview Registration for Large Data Sets, by Pulli (1999).*

Druon, Sebastien "Color constrainted ICP for registration of large unstructured 3d/color data sets" IEEE 2006.*

Johnson, Andrew "registration and integration of textured 3d data" Image and Vision Computing 1999.*

Masterov, Alexei "CS-6998—3D photography—Fall 2002."*

Douadi, Lounis, "Pair-wise registration of 3D/color data sets with ICP," International Conference on Intelligent Robots and Systems 2006.*

Li, Yunzhen, "Automatic Registration of Color Images to 3D geometry" CGI 2009.*

Lurendeau, Denis, "A method of registration of attrbuted range image," IEEE 2001.*

Oberkampf, Denis, "Iterative Pose Estimation Using Coplanar Feature Points," Computer Vision and Image Understanding 1996.*

Ullman et al., "Recognition by linear combination of models" IEEE Transactions on Pattern Analysis and Machine Intelligence, pp. 992-1006, Oct. 1991.*

Liu, et al., "A systematic approach for 2D-image to 3D-Range Registration in urban environments", Journal of Computer Vision and Image Understanding, Jan. 2012, pp. 25-37, vol. 116, No. 1.

Yu, et al., "Extracting objects from range and radiance image", IEEE Trans. Vis. Comput. Graph., 2001, vol. 7, pp. 351-364.

Stamos et al., "3-D Model Construction Using Range and Image Data", Proc. of IEEE International Conference on Computer Vision and Pattern Recognition, Jun. 2000, pp. 531-536, vol. I.

Oct. 31, 2013 German Examination Report in German Patent Application No. 112011100652.7.

Chinese Office Action dated May 5, 2014 corresponding to Chinese Patent Application No. 201180010304.0.

Jul. 20, 2015 Office Action concerning corresponding UK Patent Application No. 1214584.3.

T. Drummond, et al., "Real-Time Visual Tracking of Complex Structures," IEEE Transactions on Pattern Analysis and Machine Intelligence, vol. 24, No. 7, pp. 932-946, Jul. 2002.

P.J. Besl, et al., "A Method for Registration of 3-D Shapes," IEEE Transactions on Pattern Analysis and Machine Intelligence, vol. 14, No. 2, pp. 239-256, Feb. 1992.

A.E. Johnson, et al., "Efficient Multiple Model Recognition in Cluttered 3-D Scenes," Proc. Computer Vision and Pattern Recognition, pp. 671-677, Jun. 1998.

Roger Y. Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987.

C. Harris, et al., "A Combined Corner and Edge Detector," Proc. 4th Alvey Vision Conf., pp. 147-151, Manchester, UK, Aug. 1988.

* cited by examiner

THREE-DIMENSIONAL MEASUREMENT APPARATUS, PROCESSING METHOD, AND NON-TRANSITORY COMPUTER-READABLE STORAGE MEDIUM

TECHNICAL FIELD

The present invention relates to a three-dimensional measurement apparatus, processing method, and non-transitory computer-readable storage medium.

BACKGROUND ART

In recent years, along with the growth of robot technologies, robots perform complicated tasks (for example, assembling processes of industrial products), which were, up until now, performed manually. Such robots assemble parts by gripping them using an end effecter such as a hand.

In order to control the robot to grip a part, a relative position and orientation between the part to be gripped and the robot (hand) have to be measured (estimated). Such position and orientation measurements are used not only when the robot grips a part but also in various purposes such as self position estimation required for the robot to autonomously move and registration between a real space and virtual object in augmented reality.

In the position and orientation measurements, methods using a two-dimensional image captured by a camera and a range image obtained from a range sensor are known. For example, measurements by means of model fitting are known. In the measurements, a three-dimensional shape model of an object is fitted to features detected from the two-dimensional image or to the range image.

In the model fitting to a two-dimensional image, the position and orientation are measured by fitting a projected image obtained by projecting a three-dimensional shape model onto an image to features detected from a two-dimensional image. In the model fitting to a range image, respective points of the range image are converted into a three-dimensional point group having three-dimensional coordinates, and a three-dimensional shape model is fitted to the three-dimensional point group on a three-dimensional space, thereby measuring the position and orientation.

As a method of measuring the position and orientation using a two-dimensional image, a method of measuring the position and orientation of a camera using edges is known (T. Drummond and R. Cipolla, "Real-time visual tracking of complex structures," IEEE Transactions on Pattern Analysis and Machine Intelligence, vol. 24, no. 7, pp. 932-946, 2002. (to be referred to as reference 1 hereinafter)). With this method, a three-dimensional shape of an object is expressed by a set of line segments (wire frame model), and projected images of three-dimensional line segments are fitted to edges detected on an image, thereby measuring the position and orientation of the object. More specifically, three-dimensional line segments are projected onto the image based on approximate values of the position and orientation, so as to detect edges in the vicinity of the projected line segments. Next, the position and orientation of a target object are measured by nonlinear optimization, so as to minimize a sum total of distances on the image between the projected images of the line segments based on the approximate values of the position and orientation, and the corresponding edges.

On the other hand, as a method of measuring the position and orientation using a range image, a method using an ICP (Iterative Closest Point) algorithm is known (P. J. Besl and N. D. McKay, "A method for registration of 3-D shapes," IEEE Transactions on Pattern Analysis and Machine Intelligence, vol. 14, no. 2, pp. 239-256, 1992. (to be referred to as reference 2 hereinafter)). With this method, the position and orientation of an object are measured by fitting a three-dimensional shape model of the object to three-dimensional point group data converted from a range image. Processing for searching geometric features of the three-dimensional shape model closest to three-dimensional points based on approximate values of the position and orientation, and updating the position and orientation so as to minimize a sum total of distances between points and the geometric features of the three-dimensional model is iteratively executed.

The method of measuring the position and orientation of an object using a range image requires heavy-load arithmetic processing upon searching for planes of the three-dimensional shape model corresponding to respective points of the point group data. In order to cope with this, Japanese Patent Laid-Open No. 2006-202152 (to be referred to as reference 3 hereinafter) discloses a technique that speeds up association search processing at the time of registration of a plurality of range images. In this method, small planes (meshes) assigned with index values are fitted to a range image, the index values are converted into non-overlapping colors to obtain colors of the meshes, and an index image is generated by rendering the meshes based on the imaging position and orientation of the range image. Then, a three-dimensional point group converted from another range image is projected onto the index image based on the position and orientation at the time of imaging, and corresponding colors on the index image are acquired from the coordinate values of the projected three-dimensional points. After that, the index values corresponding to the acquired colors are inversely converted to associate the meshes with the three-dimensional points converted from the range image. In this manner, the association search processing is speeded up.

In the aforementioned registration method (reference 3) using the index image, in order to register the positions of a plurality of range images, all three-dimensional points extracted from the range images are projected onto a two-dimensional image to associate them with each other. For this reason, for example, when the position and orientation of a target object are measured from an image including an object other than the target object, since all measurement points including those of the object other than the target object have to be densely projected, resulting in wasteful processing.

In case of the method of reference 3, depending on three-dimensional shape models, the model has to be re-meshed so as to prevent meshes from being crushed at the time of projection. For this reason, it is difficult to use a CAD model of a target object intact as a three-dimensional shape model. Furthermore, in order to render meshes on a two-dimensional plane at high speed, dedicated hardware such as a GPU (Graphic Processing Unit) is required.

Furthermore, in case of the method of reference 1, all line segments as geometric features of a three-dimensional shape model as well as those on a back surface (portion which is not measured) of a target object have to be projected onto an image. Hence, the method of reference 1 also requires wasteful processing.

In this case, the method using a two-dimensional image is suited to, for example, an environment including many artificial objects on the premise of lines, and the method using a range image is suited to, for example, an object having a plurality of smooth planes.

Since the method using a two-dimensional image and that using a range image require different properties of information to be measured, the position and orientation measurement precision is expected to be improved by combining the model fitting to a two-dimensional image and that to a range image. In the model fitting to a two-dimensional image, processing for projecting geometric features of a three-dimensional shape model such as edges onto a two-dimensional image, and searching for corresponding geometric features on the two-dimensional image is executed, as described above. In the model fitting to a range image, measurement points are projected in place of geometric features of a three-dimensional shape model, as described above. That is, these methods use different association methods.

For this reason, the association processing cannot be executed using an identical framework, and has to be executed independently upon measuring the position and orientation of a target object using both a two-dimensional image and range image.

SUMMARY OF INVENTION

The present invention provides a technique which allows to speed up position and orientation calculations of a target object by efficiently making arithmetic operations executed upon associating a three-dimensional shape and measurement data with each other.

According to a first aspect of the present invention, there is provided a three-dimensional measurement apparatus comprising; image acquisition means for acquiring a range image in which pixels represent distances from a target object; approximate value acquisition means for acquiring approximate values indicating a position and an orientation of the target object; selection means for selecting points corresponding to geometric features of a three-dimensional shape model of the target object; projection means for projecting a plurality of points corresponding to the geometric features selected by the selection means onto the range image based on the approximate values indicating the position and the orientation of the target object and imaging parameters at the time of imaging of the range image, search means for searching regions of predetermined ranges respectively from the plurality of projected points for geometric features on the range image which correspond to the geometric features of the three-dimensional shape model, and associating the geometric features with each other; and position/orientation calculation means for calculating a position and an orientation of the target object using differences of distances on a three-dimensional space between the geometric features of the three-dimensional shape model and the geometric features on the range image, which are associated with each other by the search means.

According to a second aspect of the present invention, there is provided a processing method for a three-dimensional measurement apparatus for calculating a position and an orientation of a target object, characterized by comprising: a step of acquiring a range image in which pixels represent distances from a target object; a step of acquiring approximate values indicating a position and an orientation of the target object; a step of selecting points corresponding to geometric features of a three-dimensional shape model of the target object; a step of projecting a plurality of selected points corresponding to the geometric features onto the range image based on the approximate values indicating the position and the orientation of the target object and imaging parameters at the time of imaging of the range image; a step of searching regions of predetermined ranges respectively from the plurality of projected points for geometric features on the range image which correspond to the geometric features of the three-dimensional shape model, and associating the geometric features with each other; and a step of calculating a position and an orientation of the target object using differences of distances on a three-dimensional space between the geometric features of the three-dimensional shape model and the geometric features on the range image, which are associated with each other.

According to a third aspect of the present invention, there is provided a non-transitory computer-readable storage medium storing a computer program for controlling a computer incorporated in a three-dimensional measurement apparatus for calculating a position and an orientation of a target object, to function as: image acquisition means for acquiring a range image in which pixels represent distances from a target object; approximate value acquisition means for acquiring approximate values indicating a position and an orientation of the target object; selection means for selecting points corresponding to geometric features of a three-dimensional shape model of the target object; projection means for projecting a plurality of points corresponding to the geometric features selected by the selection means onto the range image based on the approximate values indicating the position and the orientation of the target object and imaging parameters at the time of imaging of the range image, search means for searching regions of predetermined ranges respectively from the plurality of projected points for geometric features on the range image which correspond to the geometric features of the three-dimensional shape model, and associating the geometric features with each other; and position/orientation calculation means for calculating a position and an orientation of the target object using differences of distances on a three-dimensional space between the geometric features of the three-dimensional shape model and the geometric features on the range image, which are associated with each other by the search means.

Further features of the present invention will be apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

DESCRIPTION OF EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
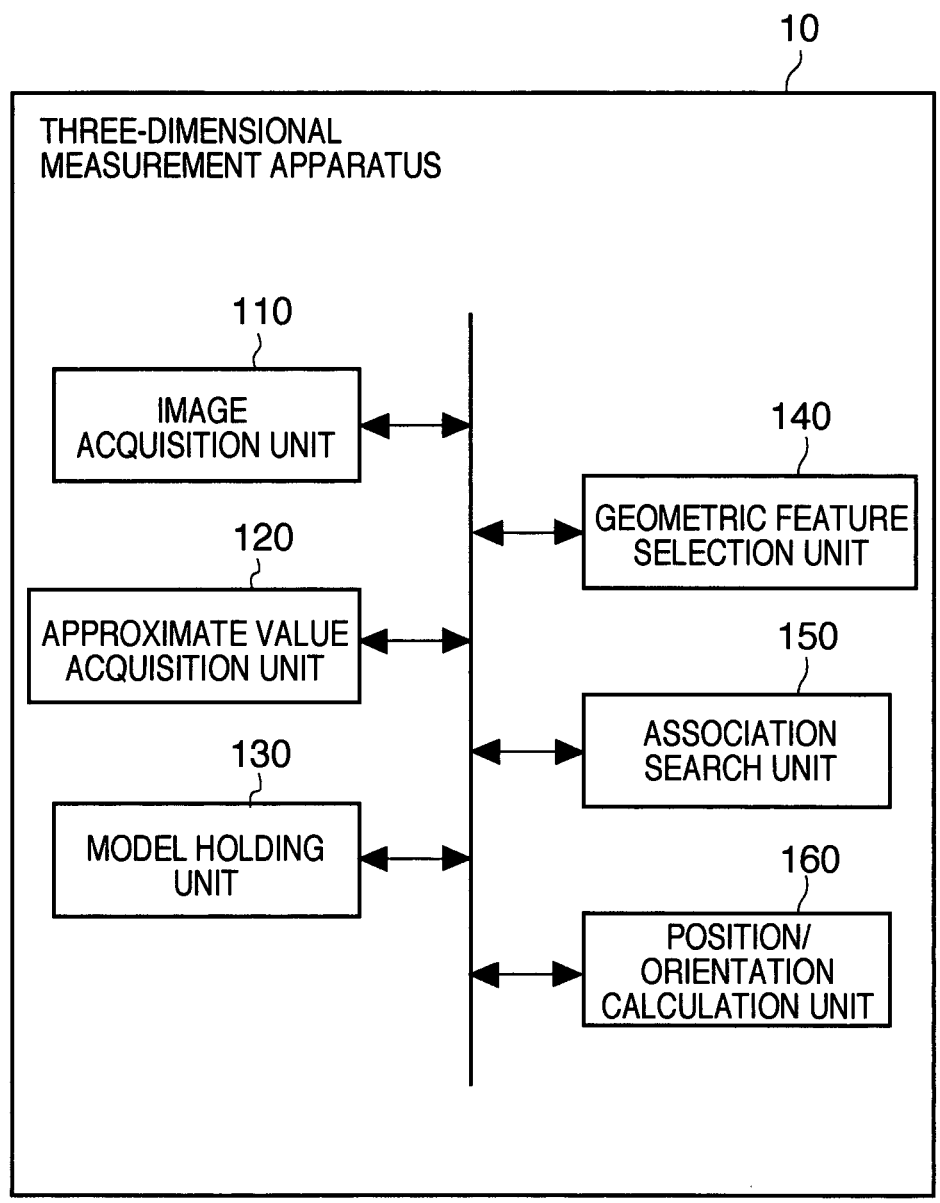
FIG. 1 is a block diagram showing an example of the arrangement of a three-dimensional measurement apparatus according to an embodiment of the present invention.

FIG. 1 is a block diagram showing an example of the arrangement of a three-dimensional measurement apparatus according to an embodiment of the present invention. Note that a three-dimensional measurement apparatus 10 incorporates a computer. The computer includes a main control unit such as a CPU, and storage units such as a ROM (Read Only Memory), RAM (Random Access Memory), and HDD (Hard Disk Drive). The computer may also include input/output units such as buttons and a display or touch panel, and a communication unit such as a network card. Note that these components are connected via, for example, a bus, and are controlled when the main control unit executes programs stored in the storage units.

The three-dimensional measurement apparatus 10 projects (arbitrary) points on geometric features of a three-dimensional shape model onto a two-dimensional plane, and searches for geometric features on the two-dimensional plane (range image), which exist within regions of predetermined ranges from the projected points on the two-dimensional plane. Then, the geometric features of the three-dimensional shape model are associated with those on the range image, and the position and orientation of a target object are calculated based on the associated geometric features.

The three-dimensional measurement apparatus 10 is configured to include an image acquisition unit 110, approximate value acquisition unit 120, model holding unit 130, geometric feature selection unit 140, association search unit 150, and position/orientation calculation unit 160.

The image acquisition unit 110 acquires a range image. In this embodiment, the image acquisition unit 110 is implemented by, for example, a range sensor which captures a range image. However, the present invention is not limited to this. For example, the image acquisition unit 110 may adopt an arrangement for simply acquiring a range image captured by an external range sensor. The range image is an image in which each pixel has depth information (distance information). The range sensor can adopt an active system that captures reflected light of laser light or slit light with which a target is irradiated, and measures a distance by triangulation. Note that the range sensor need only capture a range image, and its system is not particularly limited. For example, the range sensor may adopt a time-of-flight system using a time of flight of light, or a passive system which calculates, by triangulation, depths of respective pixels from images captured by a stereo camera. Assume that imaging parameters (a field angle, resolution, focal length, etc. at the time of imaging) of the range sensor are given. The imaging parameters are used in the association search unit 150 (to be described later).

The approximate value acquisition unit 120 acquires approximate values of the position and orientation of an object with respect to the three-dimensional measurement apparatus 10. In this embodiment, the position and orientation of the object with respect to the three-dimensional measurement apparatus 10 express those of the object with reference to the image acquisition unit 110. However, the image acquisition unit 110 need not always be used as a reference. For example, when the relative position and orientation of the object to a coordinate system of the image acquisition unit 110 are given, and they remain unchanged, another portion of the three-dimensional measurement apparatus 10 may be used as a reference.

In this embodiment, as the approximate values of the position and orientation of the object, measurement values which were measured by the three-dimensional measurement apparatus 10 previously (for example, at an immediately preceding timing) are used. However, the approximate values of the position and orientation of the object need not always be such values. For example, time-series filtering processing (for example, a linear filter or Kalman filter) is applied to the previously measured measurement values of the position and orientation of the object to estimate the motion velocity and angular velocity of the object. Then, values obtained by predicting the position and orientation of the object based on the estimation results may be used as the approximate values. Alternatively, the position and orientation of the object obtained from a sensor may be used as the approximate values. In this case, the sensor need only measure the position and orientation of the object in six degrees of freedom, and its system (for example, a magnetic system, optical system, or ultrasonic system) is not particularly limited. Note that when an approximate position and orientation where the object is placed are determined in advance, these values may be used as the approximate values. Furthermore, by applying object recognition processing to a captured image or range image obtained by capturing an image of a visual scene including the object, the approximate values of the position and orientation of the object may be measured.

The model holding unit 130 holds three-dimensional geometric model data (to be also referred to as a three-dimensional shape model hereinafter) of a target object (to be also simply referred to as an object hereinafter). The three-dimensional shape model can use the same model as in the conventional method, and a detailed description thereof will not be given. For example, the three-dimensional shape model is defined by pieces of information of planes configured by connecting point sets or points, and pieces of information of line segments which configure each plane.

The geometric feature selection unit 140 selects points on arbitrary geometric features from the three-dimensional shape model of the target object. In this embodiment, assume that the three-dimensional shape model is configured by a plurality of NURBS (Non-Uniform Rational B-Spline) curved surfaces, and geometric features of this model are sets of points and normals uniformly sampled from the respective NURBS curved surfaces. Of course, the present invention is not limited such specific geometric features. For example, the geometric features of the three-dimensional shape model may be the NURBS curved surfaces themselves or meshes when the three-dimensional shape model is expressed by meshes.

The geometric feature selection unit 140 may perform the above selection based on information that prescribes geometric features which are easily measured from the three-dimensional shape model or measurement data and those which are effective to calculate the position and orientation. That is, the geometric features can be those which can be used when the position/orientation calculation unit 160 calculates the position and orientation of the target object. Since the geometric feature selection unit 140 selects arbitrary geometric features, even when the position and orientation are to be measured for an image which includes an object other than the target object, association processing can be executed without increasing a calculation amount.

The geometric feature selection unit 140 selects points on geometric features of the three-dimensional shape model based on the imaging parameters of the range sensor and the approximate values of the position and orientation of the object acquired by the approximate value acquisition unit 120. Based on them, only geometric features which can be measured from a range image are selected.

More specifically, the three-dimensional shape model is rendered from all directions, and geometric features which are viewable from the respective directions are registered in association with the directions. Then, the geometric feature selection unit 140 selects geometric features registered in directions closest to a line of sight vector, which is calculated based on the approximate values of the position and orientation of the object, and the imaging parameters. Note that inner products between vectors of the respective directions and normals to geometric features may be compared, and only geometric features whose normals oppose the direction vectors may be registered.

Note that the geometric feature selection unit 140 may select points on geometric features based on a user instruction. That is, the user may manually select points on geometric features with reference to a GUI that displays the three-dimensional shape model of the target object. Alternatively, the center of a surface of each geometric feature may be selected as a point of that geometric feature of the three-dimensional shape model. In addition, points detected by a feature detector disclosed in A. E. Johnson and M. Hebert, "Efficient multiple model recognition in cluttered 3-d scenes," Proc. Computer Vision and Pattern Recognition, pp. 671-677, 1998. may be selected as points on geometric features of the three-dimensional shape model. Furthermore, points which are uniform on a range image may be selected based on the approximate values of the position and orientation of the object acquired by the approximate value acquisition unit 120. More specifically, the three-dimensional shape model is projected onto a two-dimensional image based on the approximate values of the position and orientation of the object and the imaging parameters of the range sensor, and points on the three-dimensional shape model, which are uniformly sampled on the two-dimensional image, are inversely projected onto a three-dimensional space. Then, points on geometric features, which become uniform on range image, are calculated and selected. In addition, the selection method is not particularly limited as long as points corresponding to geometric features of a three-dimensional shape model are selected from the surface of the model.

The association search unit 150 associates geometric features of the three-dimensional shape model with those on a range image. Then, the association search unit 150 outputs the associated sets of the geometric features of the three-dimensional shape model and those on the range image.

Figure 2:
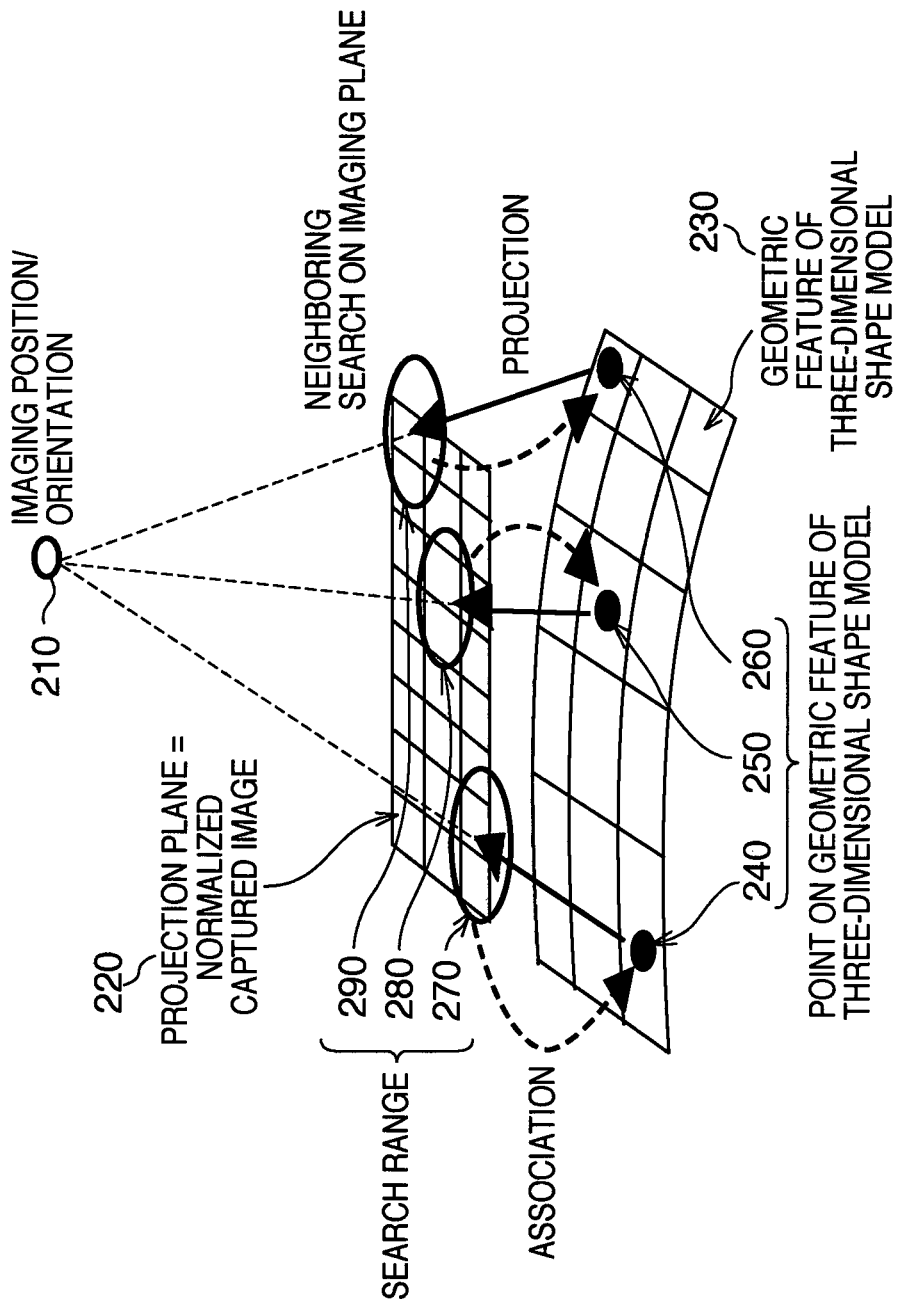
FIG. 2 is a view showing an example of association processing by an association search unit 150 shown in FIG. 1.

As shown in FIG. 2, the association search unit 150 projects a point 240 selected by the geometric feature selection unit 140 onto a two-dimensional plane (projection plane) 220. Note that this projection is performed based on the given imaging parameters (field angle, resolution, focal length, etc.) of a range image, and the approximate values of the position and orientation of the object acquired by the approximate value acquisition unit 120. Formula (1) below is used to convert three-dimensional coordinates (x, y, z) of a point selected by the geometric feature selection unit 140 into coordinates (u, v) on the two-dimensional plane (projection plane) by perspective projection.

$$(u,v)^T = (fx/z, fy/z)^T \quad (1)$$

where f is a focal length.

Pixels on the projection plane and range image uniquely correspond to each other, and a range 270 in the vicinity of the two-dimensional coordinates on the range image corresponding to the point (projected point) projected onto the projection plane is searched for a geometric feature to be associated on the range image. Since the projection calculation of a point can be attained by formula (1), an association search can be a two-dimensional search around the projected point. For this reason, since the calculation amount can be reduced, association processing between the geometric features of the three-dimensional shape model and those on a range image can be speeded up.

Figure 3:
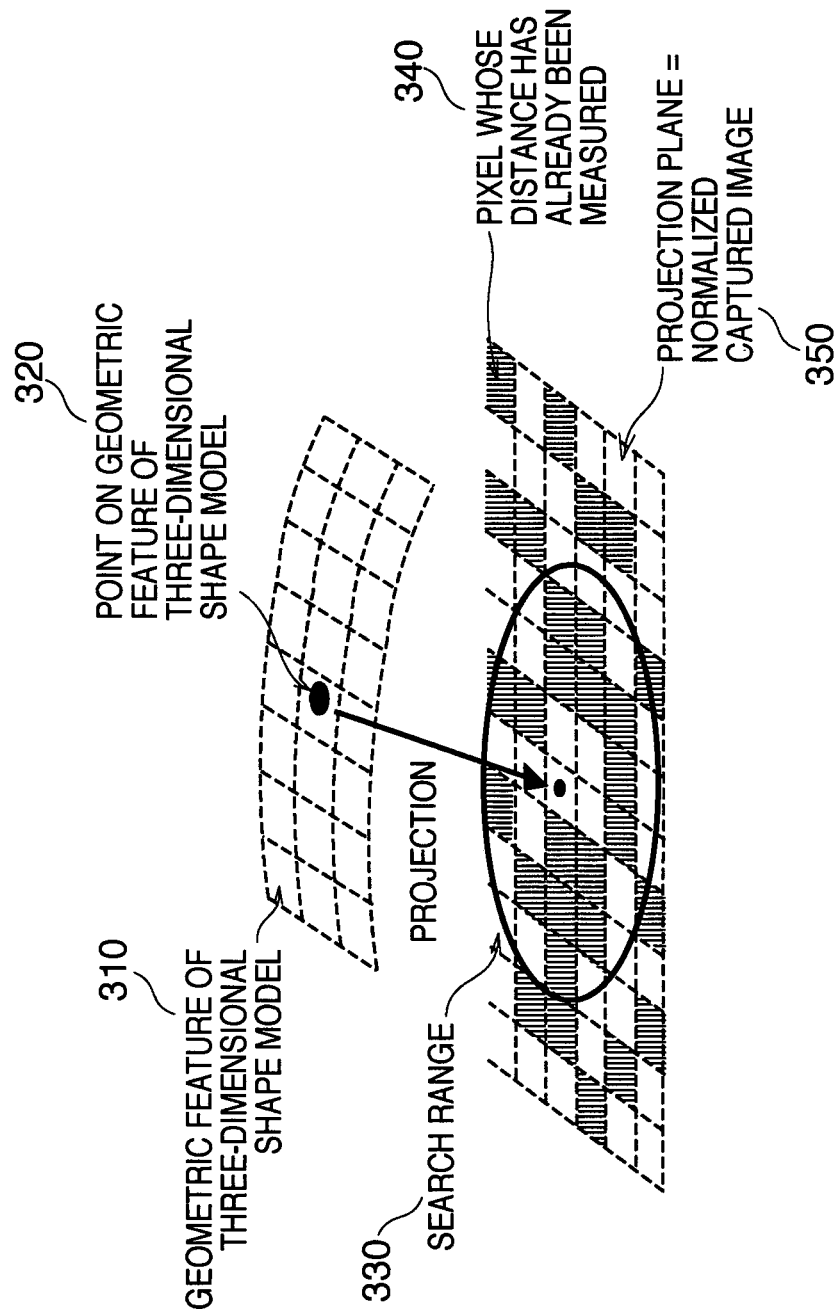
FIG. 3 is a view showing an example of association processing by the association search unit 150 shown in FIG. 1.

A geometric feature on a range image is searched for within a region Ω 330 formed by an elliptic region having the projected point as the center, as shown in FIG. 3. Note that the search range may be a pixel of the projected point or may have a rectangular shape having an arbitrary size. A size and shape of the search region Ω 330 may be decided based on at least any of, for example, the approximate values of the position and orientation of the object, the imaging parameters of the image acquisition unit 110, and a motion of the object or image acquisition unit 110. That is, the search range Ω 330 may be a rectangular or elliptic region decided based on the line of sight direction of the image acquisition unit 110 and the normal direction of a geometric feature, or an elliptic region having a motion vector as a major axis.

In this embodiment, assume that a geometric feature on a range image is defined by coordinates of a three-dimensional point obtained from depth information (distance information) included in a pixel corresponding to the projected point. As a search method of a geometric feature on a range image, a measurement point within the search range Ω 330 having a shortest distance from a projected point of a measurement point 340 can be selected. Formula (2) is used to calculate the shortest distance of coordinates $g_i$ on a range image of a measurement point measured at a projected point $p=(u, v)^T$.

$$\operatorname{argmin}\{\|g_i - p\|\}, \ g_i \in \Omega \quad (2)$$

Note that this search method need not always be adopted. For example, feature amounts of respective pixels within the search region Ω 330 may be calculated by a feature detector, and a feature amount most similar to that of a geometric feature of the three-dimensional shape model may be selected. Alternatively, for example, a median value or average value of coordinates on a three-dimensional space of measurement points within the search region Ω 330, that is, coordinates on the space, which are calculated by statistical processing may be selected. In addition, a geometric feature on a range image is not limited to a three-dimensional point, but it may be parameters of a curved surface or plane, which are fitted to measurement points within the search region Ω, as long as the geometric feature can be used when the position/orientation calculation unit 160 calculates the position and orientation of the target object.

Also, association error excluding processing may be executed. That is, a normal to a geometric feature selected on a range image is calculated, and the calculated normal is compared with that to a geometric feature of the three-dimensional shape model. If these normal directions are different beyond a predetermined value, these geometric features are not associated with each other. Note that the normal to the geometric feature on the range image can be calculated by applying principal component analysis to a three-dimensional point group adjacent to the geometric feature, and deciding a third principal component as a normal. When the association error excluding processing is executed, errors which associate measurement data of different geometric features with those of the three-dimensional shape model can be eliminated.

The position/orientation calculation unit 160 calculates the position and orientation of the target object using the sets of the geometric features of the three-dimensional shape model and those on the range image, which are associated with each other by the association search unit 150. In the calculations of the position and orientation of the target object in this embodiment, arithmetic processing is repeated to optimize values obtained by the arithmetic processing. In this manner, differences of distances on the three-dimensional space between the sets of the geometric features of the three-dimensional shape model and those on the range image, which are associated with each other, are minimized.

In this embodiment, the geometric features of the three-dimensional shape model are sets of coordinates on the three-dimensional space and pieces of normal information, and those on the range image are coordinates of three-dimensional points. A geometric feature of the three-dimensional shape model is considered as a small plane, and a distance between the plane on the three-dimensional shape model and a three-dimensional point calculated from a range image is used as a difference. Then, by minimizing this difference, the position and orientation of the target object are measured.

In this case, the difference depends on an expression method of a geometric feature. For example, if a geometric feature of the three-dimensional shape model is a point, and that on a range image is a point, the difference may be a distance between these points. Alternatively, for example, when a geometric feature of the three-dimensional shape model is a plane and that on a range image is a plane, the difference may be a distance between these planes. Alternatively, for example, when a geometric feature of the three-dimensional shape model is a plane and that on a range image is a point, the difference may be a distance between the plane and point. Furthermore, the difference may be a distance which is approximately calculated using, for example, an implicit polynomial. That is, a calculation method is not particularly limited as long as the arrangement for measuring the position and orientation of the target object using an evaluation function based on differences of the distances between the geometric features of the three-dimensional shape model and those on the range image is adopted.

Figure 4:
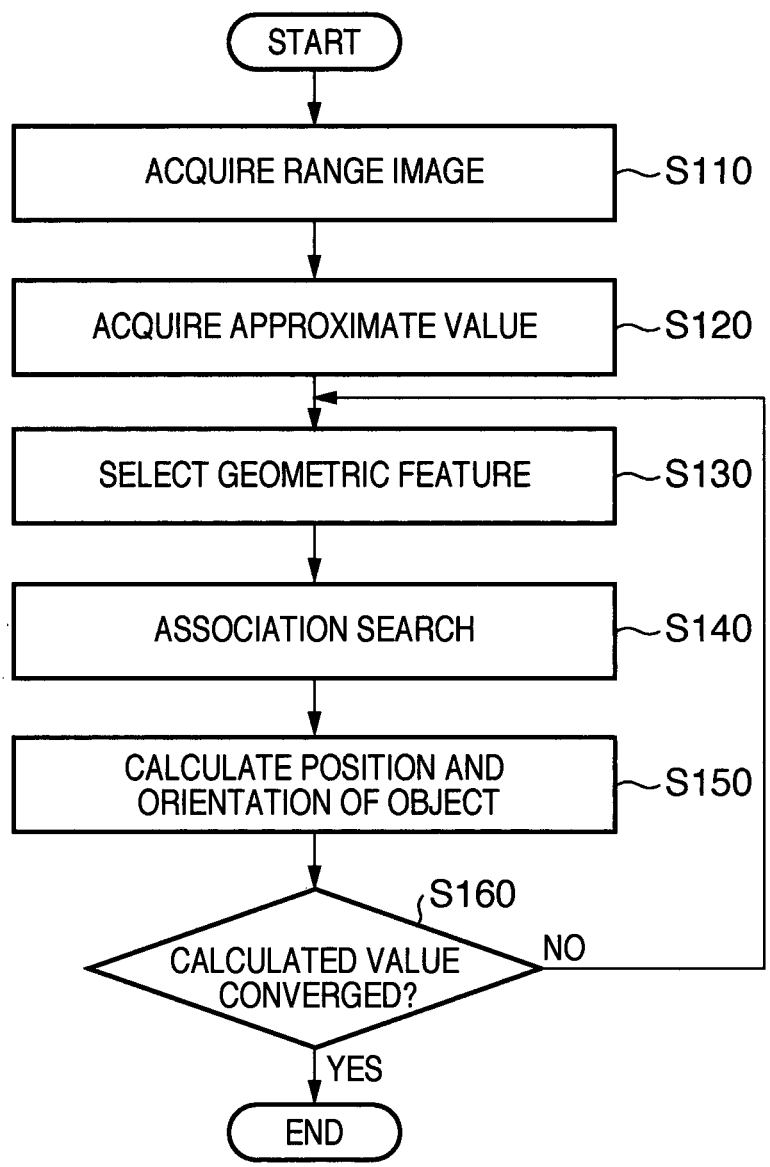
FIG. 4 is a flowchart showing an example of the operation in a three-dimensional measurement apparatus 10 shown in FIG. 1.

An example of the operation in the three-dimensional measurement apparatus 10 shown in FIG. 1 will be described below using the flowchart shown in FIG. 4. In this case, the sequence of processing upon measuring the position and orientation of an object will be explained.

The three-dimensional measurement apparatus 10 controls the image acquisition unit 110 to capture a range image including depth information (distance information) from the range sensor. Thus, the range image is acquired (S110).

After completion of acquisition of the range image, the three-dimensional measurement apparatus 10 controls the approximate value acquisition unit 120 to acquire the approximate values of the position and orientation of the object with respect to the three-dimensional measurement apparatus 10 (S120). As described above, the approximate values of the position and orientation of the object can use, for example, the previously measured position and orientation, predicted values of the position and orientation by adding tinges of estimation results of motions such as a velocity and angular velocity, measurement values by another sensor, and the object recognition results from a two-dimensional image and range image. Note that this embodiment uses the previously measured approximate values of the position and orientation as the approximate values of the position and orientation of the object. Note that the order of the processes in steps S110 and S120 may be replaced.

Next, the three-dimensional measurement apparatus 10 starts position/orientation measurement processing of the target object using, for example, the range image acquired by the process in step S110 and the approximate values acquired by the process in step S120. The position/orientation measurement processing according to this embodiment uses a Levenberg-Marquardt method. More specifically, the approximate values of the position and orientation of the object are repetitively corrected by iterative arithmetic operations. In this way, the differences of the distances on the three-dimensional space between the geometric features of the three-dimensional shape model and those on the range image are minimized, and values obtained as a result of this processing are determined as the position and orientation of the target object. Of course, the present invention is not limited to the Levenberg-Marquardt method. For example, other optimization methods such as a Gauss-Newton method and steepest descent method may be used. Alternatively, other nonlinear optimization calculation methods such as a conjugate gradient method may be used.

After the position/orientation measurement processing is started, the three-dimensional measurement apparatus 10 acquires the approximate values of the target object obtained by the process in step S120 as initial values of the position/orientation measurement processing. Then, the three-dimensional measurement apparatus 10 controls the geometric feature selection unit 140 to select geometric features of the three-dimensional shape model based on the approximate values (S130).

Upon completion of the selection, the three-dimensional measurement apparatus 10 controls the association search unit 150 to project the geometric features of the three-dimensional shape model onto the range image (two-dimensional plane) based on the approximate values of the position and orientation of the target object and the imaging parameters (field angle, resolution, focal length, etc.) of the range sensor. Then, the association search unit 150 associates the geometric features of the three-dimensional shape model with those on the range image, and outputs the associated sets of the geometric features of the three-dimensional shape model and those on the range image (S140). The three-dimensional measurement apparatus 10 controls the position/orientation calculation unit 160 to update the approximate values of the position and orientation of the target object by the nonlinear optimization method (S150).

Finally, the three-dimensional measurement apparatus 10 controls the position/orientation calculation unit 160 to make convergence determination. If calculated values are converged (YES in step S160), the processing ends; otherwise (NO in step S160), the process returns to step S130, and the aforementioned processes in steps S130 to S150 are repeated. Note that in the convergence determination, for example, if differences between square sums of error vectors of the position and orientation before and after the update process are nearly "0", it can be determined that the calculated values are converged.

As described above, according to the first embodiment, upon associating the geometric features of the three-dimensional shape model and range image with each other, points on the geometric features of the three-dimensional shape model are selected, and the selected points on the geometric features are projected onto the range image. Then, by searching for geometric features which exist within regions of predetermined ranges from the projected points on the range image, the geometric features of the three-dimensional shape model are associated with those on the range image. In this way, arithmetic operations can be efficiently executed upon associating the three-dimensional shape model with measurement data.

Second Embodiment

Figure 5:
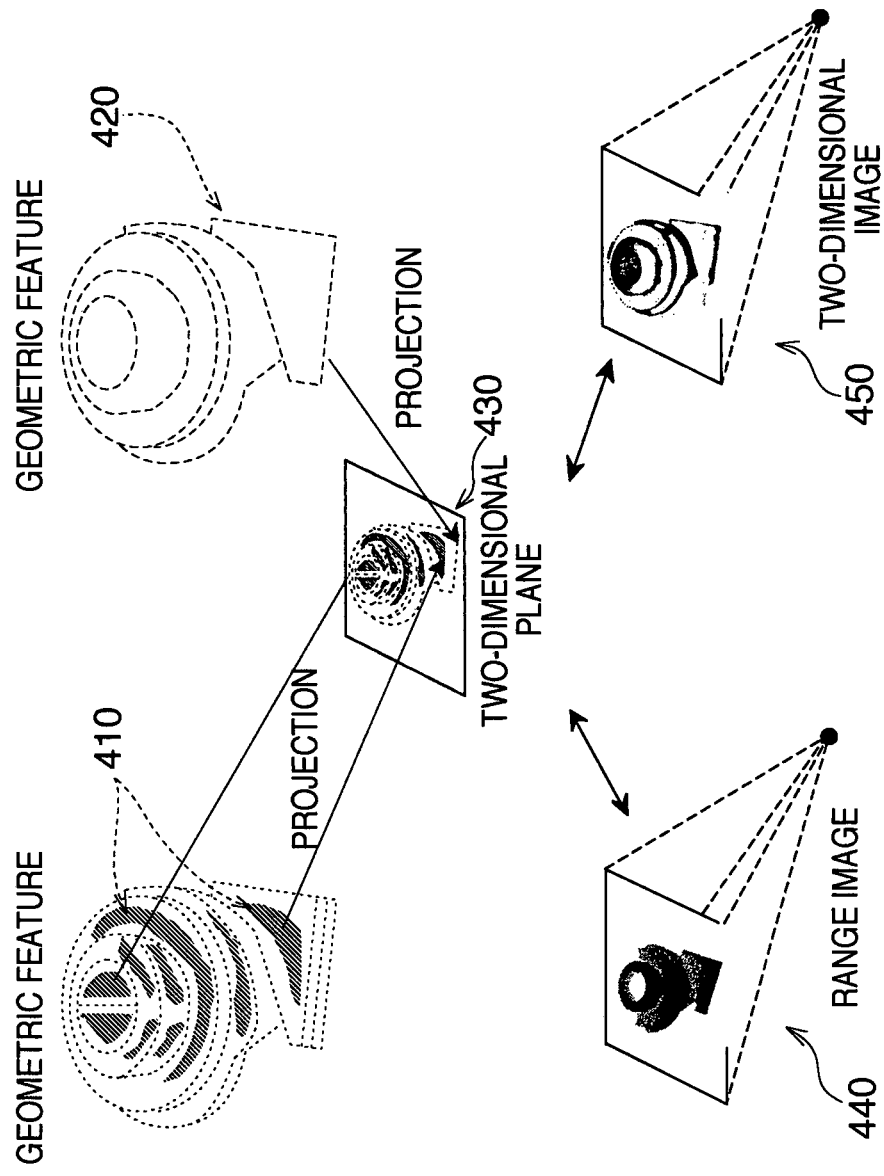
FIG. 5 is a view showing an example of association processing according to the second embodiment.

The second embodiment will be described below. The second embodiment will explain a case in which a two-dimensional image is input as an input image in addition to a range image. FIG. 5 is a view showing an overview of processing for projecting geometric features of a three-dimensional shape model onto a two-dimensional plane, and searching a two-dimensional image and range image for corresponding geometric features.

For both of a range image 440 and two-dimensional image 450, geometric features 410 and 420 of a three-dimensional shape model are projected onto a two-dimensional plane (projection plane) 430 to search for corresponding geometric features on the images from the two-dimensional plane, thereby associating those geometric features with each other.

For this reason, the efficiency of arithmetic processing required to associate the three-dimensional shape model and measurement data with each other can be improved. Assume that in this embodiment, the range image 440 and two-dimensional image 450 are captured at the same viewpoint. In this case, the geometric features on the two-dimensional image can be relatively easily compared with those on the range image, thus allowing to determine a jump edge (isolated edge) in addition to elimination of association errors due to the influence of, for example, a shadow.

In this case, the overall arrangement of a three-dimensional measurement apparatus 10 according to the second embodiment is the same as that of the first embodiment, but processes in respective units are slightly different. Such differences will be described below. Note that the following description will be given while focusing on the different processes.

An image acquisition unit 110 acquires a two-dimensional image and range image. The range image is captured by a range sensor in the same manner as in the first embodiment. The two-dimensional image is captured by a camera (imaging apparatus) which is used to capture a normal two-dimensional image. The two-dimensional image to be captured may be a density image or a color image. A camera model such as a focal length and principal point position of a camera and lens distortion parameters is calibrated in advance by a method disclosed in, for example, R. Y. Tsai, "A versatile camera calibration technique for high-accuracy 3D machine vision metrology using off-the-shelf TV cameras and lenses," IEEE Journal of Robotics and Automation, vol. RA-3, no. 4, 1987.

In the second embodiment, for example, a range sensor of an active system, which is exemplified in the first embodiment, is used. This is because the range sensor of the active system, that using a stereo camera, and the like can also simultaneously capture a normal two-dimensional image. For this reason, the two-dimensional image and range image can be captured from the same viewpoint. However, the two-dimensional image and range image need not always be captured from the same viewpoint. Note that when the imaging positions and orientations of imaging apparatuses in the two-dimensional image and range image are closer to each other, and the geometrical relationship between the two apparatuses is given, one of the two-dimensional image and range image may undergo projection transformation based on the geometrical relationship between the two apparatuses, and an image obtained by that transformation may be used as that captured from the same viewpoint.

An association search unit 150 associates the geometric features of the three-dimensional shape model, which are selected by the geometric feature selection unit 140, with those on the two-dimensional image and range image, and outputs the associated sets of the geometric features of the three-dimensional shape model and those on the range image and two-dimensional image. The association search unit 150 attains the association processing by projecting the geometric features of the three-dimensional shape model, which are selected by the geometric feature selection unit 140, onto a two-dimensional plane (projection plane), as in the first embodiment. Note that the association processing between the three-dimensional shape model and range image is the same as that in the first embodiment. The association processing between the three-dimensional shape model and two-dimensional image can use edges as geometric features. Since the association processing based on the edges can use the conventional technique, a detailed description thereof will not be given. Note that the geometric features may be feature points detected by a feature detector disclosed in C. Harris and M. Stephens, "A combined corner and edge detector," Proc. 4th Alvey Vision Conf., pp. 147-151, Manchester, U.K., 1988. In addition, the geometric features can be those which can be used when a position/orientation calculation unit 160 measures the position and orientation of the target object.

Since the two-dimensional image and range image according to this embodiment are those captured from the same viewpoint, pixels on the projection plane, two-dimensional image, and range image uniquely correspond to each other. For this reason, as in the first embodiment, using a predetermined range (a region) around a projected point as a search region Ω, a geometric feature on an image corresponding to that of the three-dimensional shape model is two-dimensionally searched for. The search region Ω may be a rectangular or elliptic region as in the first embodiment. Note that upon searching for edges on the two-dimensional image, a line having an arbitrary length may undergo a linear search in the normal direction of an edge.

Furthermore, association error excluding processing described in the first embodiment may be applied to the two-dimensional image. The association error excluding processing is executed based on, for example, comparison between feature amounts and that between edge directions. If features which correspond to the edges or feature amounts detected on the two-dimensional image cannot be detected from the range image, the association error excluding processing may be executed to skip the association processing since it is determined that they are the edges or feature amounts caused by the influence of, for example, a shadow.

Also, processing for determining whether or not an edge detected on the two-dimensional image is a jump edge may be executed using the range image. Since the range image and two-dimensional image are captured from the same viewpoint, the association error excluding processing can be efficiently executed using both the two-dimensional image and range image.

The position/orientation calculation unit 160 calculates the position and orientation of the target object using the sets of the geometric features of the three-dimensional shape model and those on the two-dimensional image and range image, which are associated with each other by the association search unit 150. Upon calculations of the position and orientation of the target object in this embodiment, arithmetic processing is repeated to optimize the values obtained by that processing. In this way, evaluation functions based on both of differences of distances on a three-dimensional space between the geometric features of the three-dimensional shape model and those on the two-dimensional space, and differences of distances on the three-dimensional space between the geometric features of the three-dimensional shape model and those on the range image are minimized.

Note that since the two-dimensional image does not include any depth information, the geometric features of the two-dimensional image are projected onto the three-dimensional space in, for example, a state without any depth information. Of course, depth information may be assigned to each of the geometric features of the two-dimensional image using a predetermined algorithm or predetermined values.

In addition, the measurement method is not particularly limited as long as it measures the position and orientation of the target object based on evaluation functions based on the differences between the geometric features of the three-dimensional shape model and those on the two-dimensional image and range image. Note that the sequence of position/orientation measurement processing according to the second embodiment is the same as that in the first embodiment, and a description thereof will not be repeated.

Note that in the second embodiment, the geometric features to be associated of the three-dimensional shape model may be curved surfaces, planes, or curves. However, in order to project complicated shapes such as NURBS curved surfaces popularly used in a CAD model onto a two-dimensional plane, tessellation or processing for clipping curved surfaces using contour lines is required, and a huge time is required for arithmetic processing unless dedicated hardware for geometric calculations such as a GPU is available. Hence, as in the first embodiment, the geometric features of the three-dimensional shape model are expressed as points or line segments, and the points or line segments are projected onto the two-dimensional plane. With this projection, the association processing can be speeded up without requiring any dedicated hardware.

As described above, according to the second embodiment, arithmetic operations executed upon associating the three-dimensional shape model and measurement data with each other can be efficiently made as in the first embodiment.

The representative embodiments of the present invention have been exemplified. However, the present invention is not limited to the aforementioned and illustrated embodiments, and allows modifications as needed without departing from the scope of its gist.

Note that the present invention can adopt embodiments in the form of, for example, a system, apparatus, method, program, or storage medium. More specifically, the present invention may be applied to either a system configured by a plurality of devices or an apparatus including a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-039201 filed on Feb. 24, 2010, which is hereby incorporated by reference herein in its entirety.

The invention claimed is:

1. An apparatus comprising:
   (a) an image acquisition unit configured to acquire a range image in which pixels represent distances from a target object and a two-dimensional image representing a shape of the target object;
   (b) an approximate value acquisition unit configured to acquire an approximate position and orientation of the target object;
   (c) a holding unit configured to (1) associate (i) a plurality of first geometric features which are features on a curved or planar surface of a three-dimensional shape model of the target object and a plurality of second geometric features which are features on a line of the three-dimensional shape model of the target object, which are visible on each of a plurality of viewpoints for observing the three-dimensional shape model of the target object, with (ii) the viewpoints, and (2) hold the plurality of first geometric features, the plurality of second geometric features, and the viewpoints;
   (d) a selection unit configured to select (i) a plurality of first geometric features to be projected from the plurality of the first geometric features and (ii) a plurality of second geometric features to be projected from the plurality of the second geometric features, based on the approximate position and orientation;
   (e) a first projection unit configured to project the plurality of selected first geometric features of the three-dimensional shape model onto the range image based on the approximate position and orientation of the target object;
   (f) a second projection unit configured to project the plurality of selected second geometric features of the three-dimensional shape model onto the two-dimensional image based on the approximate position and orientation of the target object;
   (g) a first association unit configured to associate the plurality of projected first geometric features with a plurality of three-dimensional coordinates respectively on the range image based on a result of a projection by the first projection unit;
   (h) a second association unit configured to associate the plurality of projected second geometric features with a plurality of edge features on the two-dimensional image respectively based on a result of a projection by the second projection unit; and
   (i) a position/orientation derivation unit configured to derive a position and an orientation of the target object based on (1) distances between the plurality of projected first geometric features of the three-dimensional shape model and the plurality of three-dimensional coordinates on the range image, which are associated by the first association unit, and (2) distances between the plurality of projected second geometric features of the three-dimensional shape model and the plurality of edge features on the two-dimensional image, which are associated by the second association unit, wherein the distances are distances in a three-dimensional space.

2. The apparatus according to claim 1, wherein the first association unit compares a normal direction to the first geometric features of the three-dimensional shape model with a normal direction corresponding to the three-dimensional coordinates detected from a predetermined range of a position of the projected first geometric features on the range image, and when the two normal directions are different beyond a predetermined value, the first association unit skips the association of geometric features with three-dimensional coordinates.

3. The apparatus according to claim 1, wherein the two-dimensional image is captured from the same viewpoint as the range image, and
wherein the second association unit skips association of geometric features with edge features between an edge which is not included in the three-dimensional coordinates on the range image and a corresponding second geometric feature of the three-dimensional shape model upon execution of the association of geometric features with edge features between the detected edges and the second geometric features of the three-dimensional shape model.

4. The apparatus according to claim 1, further comprising a control unit configured to perform a control for repeating processing by the first association unit, the second association unit and the position/orientation derivation unit, so as to minimize the distances between the associated first geometric features of the three-dimensional shape model and the three-dimensional coordinates on the range image and the distances between the second geometric features of the three-dimensional shape model and the edge features on the two-dimensional image.

5. The apparatus according to claim 1, further comprising a search unit configured to search regions of predetermined ranges from the plurality of projected second geometric features for a plurality of edge features on the two-dimensional image which correspond to the plurality of second geometric features of the three-dimensional shape model.

6. The apparatus according to claim 1, wherein the selection unit selects the plurality of first geometric features and the plurality of second geometric features, which are associated with a viewpoint of a position and orientation closest to the approximate position and orientation.

7. A processing method for an apparatus for calculating a position and an orientation of a target object, the processing method comprising:
acquiring a range image in which pixels represent distances from a target object and a two-dimensional image representing a shape of the target object;
acquiring an approximate position and orientation of the target object;
associating (i) a plurality of first geometric features which are features on a curved or planar surface of a three-dimensional shape model of the target object and a plurality of second geometric features which are features on a line of the three-dimensional shape model of the target object, which are visible on each of a plurality of viewpoints for observing the three-dimensional shape model of the target object, with (ii) the viewpoints, and holding the plurality of first geometric features, the plurality of second geometric features, and the viewpoints;
selecting (i) a plurality of first geometric features to be projected from the plurality of the first geometric features and (ii) a plurality of second geometric features to be projected from the plurality of the second geometric features, based on the approximate position and orientation;
projecting the plurality of selected first geometric features of the three-dimensional shape model onto the range image based on the approximate position and orientation of the target object;
projecting the plurality of selected second geometric features of the three-dimensional shape model onto the two-dimensional image based on the approximate position and orientation of the target object;
associating the plurality of projected selected first geometric features with a plurality of three-dimensional coordinates respectively on the range image based on a result of a projection in the projecting of the plurality of the first geometric features;
associating the plurality of projected selected second geometric features with a plurality of edge features on the two-dimensional image respectively based on a result of a projection in the projecting of the plurality of the second geometric features; and
deriving a position and an orientation of the target object based on (i) distances between the plurality of projected first geometric features of the three-dimensional shape model and the plurality of three-dimensional coordinates on the range image, which are associated in the associating of the plurality of projected first geometric features, and (ii) distances between the plurality of projected second geometric features of the three-dimensional shape model and the plurality of edge features on the two-dimensional image, which are associated in the associating of the plurality of projected second geometric features,
wherein the distances are distances in a three-dimensional space.

8. A non-transitory computer-readable storage medium storing a computer program for controlling a computer, the computer being incorporated in a three-dimensional measurement apparatus for calculating a position and an orientation of a target object, to function as:
(a) an image acquisition unit configured to acquire a range image in which pixels represent distances from a target object and a two-dimensional image representing a shape of the target object;
(b) an approximate value acquisition unit configured to acquire an approximate position and orientation of the target object;
(c) a holding unit configured to (1) associate (i) a plurality of first geometric features which are features on a curved or planar surface of a three-dimensional shape model of the target object and a plurality of second geometric features which are features on a line of the three-dimensional shape model of the target object, which are visible on each of a plurality of viewpoints for observing the three-dimensional shape model of the target object, with (ii) the viewpoints, and (2) hold the plurality of first geometric features, the plurality of second geometric features, and the viewpoints;

(d) a selection unit configured to select (i) a plurality of first geometric features to be projected from the plurality of the first geometric features and (ii) a plurality of second geometric features to be projected from the plurality of the second geometric features, based on the approximate position and orientation;

(e) a first projection unit configured to project the plurality of selected first geometric features of the three-dimensional shape model onto the range image based on the approximate position and orientation of the target object;

(f) a second projection unit configured to project the plurality of selected second geometric features of the three-dimensional shape model onto the two-dimensional image based on the approximate position and orientation of the target object;

(g) a first association unit configured to associate the plurality of projected first geometric features with a plurality of three-dimensional coordinates respectively on the range image based on a result of a projection by the first projection unit;

(h) a second association unit configured to associate the plurality of projected second geometric features with a plurality of edge features on the two-dimensional image respectively based on a result of a projection by the second projection unit; and (i) a position/orientation derivation unit configured to derive a position and an orientation of the target object based on (1) distances between the plurality of projected first geometric features of the three-dimensional shape model and the plurality of three-dimensional coordinates on the range image, which are associated by the first association unit, and (2) distances between the plurality of projected second geometric features of the three-dimensional shape model and the plurality of edge features on the two-dimensional image, which are associated by the second association unit, wherein the distances are distances in a three-dimensional space.

9. A three-dimensional measurement apparatus comprising:

(a) an image acquisition unit configured to acquire a range image in which pixels represent distances from a target object and a two-dimensional image representing a shape of the target object;

(b) a holding unit configured to (1) associate (i) a plurality of first geometric features which are features on a curved or planar surface of a three-dimensional shape model of the target object and a plurality of second geometric features which are features on a line of the three-dimensional shape model of the target object, which are visible on each of a plurality of viewpoints for observing the three-dimensional shape model of the target object, with (ii) the viewpoints, and (2) hold the plurality of first geometric features, the plurality of second geometric features, and the viewpoints;

(c) a selection unit configured to select (i) a plurality of first geometric features to be projected from the plurality of the first geometric features and (ii) a plurality of second geometric features to be projected from the plurality of the second geometric features, based on the approximate position and orientation;

(d) a first projection unit configured to project the plurality of selected first geometric features of the three-dimensional shape model onto the range image;

(e) a second projection unit configured to project the plurality of selected second geometric features of the curved or planar surface of the three-dimensional shape model onto the two-dimensional image;

(f) a first association unit configured to associate the plurality of projected first geometric features with a plurality of three-dimensional coordinates respectively on the range image based on a result of a projection by the first projection unit;

(g) a second association unit configured to associate the plurality of projected second geometric features with a plurality of edge features on the two-dimensional image respectively based on a result of a projection by the second projection unit; and (h) a position/orientation derivation unit configured to derive a position and an orientation of the target object based on (1) distances between the plurality of projected three-dimensional coordinates of the three-dimensional shape model and the plurality of three-dimensional coordinates on the range image, which are associated by the first association unit, and (2) differences between the plurality of projected second geometric features of the three-dimensional shape model and the plurality of edge features on the range image, which are associated by the second association unit, wherein the distances are distances in a three-dimensional space.

10. The apparatus according to claim 9, further comprising a search unit configured to search regions of predetermined ranges from the plurality of projected second geometric features for edge features on the two-dimensional image which correspond to the plurality of second geometric features of the three-dimensional shape model.

11. A processing method for a three-dimensional measurement apparatus for calculating a position and an orientation of a target object, the processing method comprising:

acquiring a range image in which pixels represent distances from a target object and a two-dimensional image representing a shape of the target object;

associating, in a holding unit, (i) a plurality of first geometric features which are features on a curved or planar surface of a three-dimensional shape model of the target object and a plurality of second geometric features which are features on a line of the three-dimensional shape model of the target object, which are visible on each of a plurality of viewpoints for observing the three-dimensional shape model of the target object, with (ii) the viewpoints, and holding the plurality of first geometric features, the plurality of second geometric features, and the viewpoints;

selecting (i) a plurality of first geometric features to be projected from the plurality of the first geometric features and (ii) a plurality of second geometric features to be projected from the plurality of the second geometric features, based on the approximate position and orientation;

projecting the plurality of selected first geometric features of the three-dimensional shape model onto the range image;

projecting the plurality of selected second geometric features of the curved or planar surface of the three-dimensional shape model onto the two-dimensional image;

associating the plurality of projected first geometric features with a plurality of three-dimensional coordinates respectively on the range image based on a result of a projection in the projecting of the plurality of first geometric features;

associating the plurality of projected second geometric features with a plurality of edge features on the two-dimensional image respectively based on a result of a projection in the projecting of the plurality of second geometric features; and deriving a position and an orientation of the target object based on (i) distances between the plurality of projected three-dimensional coordinates of the three-dimensional shape model and the plurality of three-dimensional coordinates on the range image, which are associated in the associating of the plurality of projected first geometric features, and (ii) differences between the plurality of projected second geometric features of the three-dimensional shape model and the plurality of edge features on the range image, which are associated in the associating of the plurality of projected second geometric features, wherein the distances are distances in a three-dimensional space.

12. A non-transitory computer-readable storage medium storing a computer program for controlling a computer, the computer being incorporated in a three-dimensional measurement apparatus for calculating a position and an orientation of a target object, to function as:

(a) an image acquisition unit configured to acquire a range image in which pixels represent distances from a target object and a two-dimensional image representing a shape of the target object;

(b) a holding unit configured to (1) associate (i) a plurality of first geometric features which are features on a curved or planar surface of a three-dimensional shape model of the target object and a plurality of second geometric features which are features on a line of the three-dimensional shape model of the target object, which are visible on each of a plurality of viewpoints for observing the three-dimensional shape model of the target object, with (ii) the viewpoints, and (2) hold the plurality of first geometric features, the plurality of second geometric features, and the viewpoints;

(c) a selection unit configured to select (i) a plurality of first geometric features to be projected from the plurality of the first geometric features and (ii) a plurality of second geometric features to be projected from the plurality of the second geometric features, based on the approximate position and orientation;

(d) a first projection unit configured to project the plurality of selected first geometric features of the three-dimensional shape model onto the range image;

(e) a second projection unit configured to project the plurality of selected second geometric features of the curved or planar surface of the three-dimensional shape model onto the two-dimensional image;

(f) a first association unit configured to associate the plurality of projected first geometric features with a plurality of three-dimensional coordinates respectively on the range image based on a result of a projection by the first projection unit;

(g) a second association unit configured to associate the plurality of projected second geometric features with a plurality of edge features on the two-dimensional image respectively based on a result of a projection by the second projection unit; and (h) a position/orientation derivation unit configured to derive a position and an orientation of the target object based on distances between the plurality of projected three-dimensional coordinates of the three-dimensional shape model and the plurality of three-dimensional coordinates on the range image, which are associated by the first association unit and differences between the plurality of projected second geometric features of the three-dimensional shape model and the plurality of edge features on the range image, which are associated by the second association unit, wherein the distances are distances in a three-dimensional space.

* * * * *